(12) United States Patent
Skergan

(10) Patent No.: US 6,226,345 B1
(45) Date of Patent: May 1, 2001

(54) HIGH SPEED CLOCK HAVING A PROGRAMMABLE RUN LENGTH

(75) Inventor: Timothy Michael Skergan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,076

(22) Filed: Nov. 4, 1999

(51) Int. Cl.[7] .................................................. H03K 21/00
(52) U.S. Cl. ................................ 377/37; 377/27; 377/33
(58) Field of Search ................................... 377/27, 33, 37

(56) References Cited

U.S. PATENT DOCUMENTS 4,398,085 * 8/1983 Benedict ............................... 377/20

* cited by examiner

Primary Examiner—Margaret R. Wambach
(74) Attorney, Agent, or Firm—Volel Emile; Mark A. Watson

(57) ABSTRACT

The present invention is embodied in a system and method for using cascaded counters with a programmable branch and one or more event clocks that together provide the capability to generate clock pulses at high speed. Further, the programmable counter of the present invention is capable of generating a precise number of clock pulses within a very wide range of numbers.

25 Claims, 4 Drawing Sheets

HIGH SPEED CLOCK HAVING A PROGRAMMABLE RUN LENGTH

BACKGROUND OF THE INVENTION

1. Field of the Invention

The present invention relates to a system and method embodied in a high speed programmable counter that will run for a specified number of cycles, and in particular to a high speed programmable counter for large numbers of cycles using cascaded counters with a programmable branch that together provide the capability to generate a desired number of clock pulses within an extremely wide range.

2. Description of the Related Art

Microprocessors commonly use counters to provide clock signals to drive a variety of logic circuits within the microprocessor. As the complexity of microprocessors and logic elements increases, the need for larger counters, or counters that can count to greater numbers, into the millions or higher, also increases. However, as the size of a counter increases, the numbers of levels of logic required to drive the counter also increases. Consequently, the speed of that counter effectively decreases as the complexity of the logic increases. In other words, as the counters ability to count to higher numbers increases, a proportional decrease in the speed of that counter is experienced. Consequently, such counters are often too slow to drive the logic elements of microprocessors at the necessary speeds as the speeds of the microprocessors increase.

In order to address the issue of decreased speed in large counters, smaller counters have been cascaded together. In effect, cascading of two or more relatively small counters allows much higher clock speeds to be achieved by the cascaded counters than can be achieved by simply using a single large counter. However, unlike a single large counter, simply cascading two or more smaller counters does not provide the capability to generate a specific number of clock pulses that is not a modulus of the bit size of the individual counters within the cascade. As a result, when such counters are used, they will typically be set to count beyond the required number of clock pulses, thereby resulting in wasted clock pulses and decreased system performance.

Further, microprocessors often contain a large number of individual logic circuits that may each require a different, yet specific, number of clock pulses to perform a certain function. As a result, different counters are often used to provide different numbers of clock pulses to specific logic circuits. Consequently, the ability to achieve multiple specific count numbers, such as for example a prime number count, is not possible with a simple cascade of counters. Therefore, what is needed is a system and method for using a variable or programmable counter to generate specific numbers of clock pulses at high speed.

SUMMARY OF THE INVENTION

To overcome the limitations in the related art described above, and to overcome other limitations that will become apparent upon reading and understanding the present application, the present invention is embodied in a programmable counter that uses cascaded sub-counters with a programmable branch to provide the capability to generate a desired number of clock pulses at high speed.

The system and method of the present invention achieves precise control over the number of clock pulses generated by a programmable counter. In general, a programmable initialization counter is coupled to an initialization clock generator to generate a programmable number of clock pulses. Further, one or more event clock generators are disposed in series between primary and secondary programmable cascaded counters that are coupled to the initialization clock.

Specifically, once the initialization clock generator has completed generation of the specified number of clock pulses, the event clock generators disposed in series between primary and secondary cascaded counters, each generate, in series, a clock for each count of the secondary cascaded counter. However, each of the event clock generators is also capable of being enabled or disabled via an enable latch so that they will generate clock pulses when enabled. Once the secondary cascaded counter has completed counting to a specified number, the count of the primary cascaded counter is decremented. Next, a programmable branch pointer coupled to the primary cascaded counter branches back to either the programmable initialization counter, the secondary cascaded counter, or to any of the one or more event clock generators disposed in series between primary and secondary cascaded counters. This process preferably repeats until the count of the primary cascaded counter has reached the specified number, at which point the programmable counter of the present invention preferably stops.

The programmable branch pointer preferably branches back to one or more specific branch points so that, in combination with the initial values programmed into the initialization counter as well as the primary and secondary cascaded counters, the total clock count of the programmable counter of the present invention can be defined exactly.

The programmable counter of the present invention can achieve an extremely wide range of counts. The programmable counter allows for a reduction in the number of unique counters in a system, with a corresponding reduction in system cost. Further, because the bit depth of the cascaded counters can be relatively shallow, the speed of a programmable counter in accordance with the present invention is fast enough to meet the clock demands of extremely fast microprocessors.

For illustrative purposes only, one example of a programmable counter according to the present invention uses a four-bit initialization counter followed by a clock generator and both primary and secondary cascaded counters that are also four-bits wide, an event clock generator disposed between the primary and secondary cascaded counters, and a programmable branch pointer coupled to the primary cascaded counter. With a four-bit depth, the initialization counter can be programmed to count to any number between 0 and 15. Therefore, because the initialization clock may be enabled or disabled via an enable latch, the initialization clock generator can generate from 0 to 16 clock pulses. Further, the four-bit cascaded counters with the event clock generator are capable of generating any number of counts between 0 and 255, and thus from 0 to 256 clock pulses. Consequently, the programmable counter of this trivial example is capable of reaching any specific count, and thus clock pulses, between 0 and 272. Further, a maximum count of 512 is also possible given this configuration.

The programmable counter of the present invention is not limited to the case illustrated above, either in the bit depth of the initialization counter, the bit depth of the primary or secondary cascaded counters, or in the number of event clock generators disposed between the primary and secondary cascaded counters. Further, while the bit depth of the initialization counter, and the primary and secondary cascaded counters were equal in the example, the programmable counter of the present invention may use different bit depths for each of the components of the programmable counter.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

The present invention is embodied in a system and method for using programmable cascaded counters with a programmable initialization counter and a programmable branch pointer to provide the capability to generate a desired number of clock pulses at high speed. In other words, the system and method of the present invention provides a programmable counter that is capable of generating a precise number of clock pulses for use with high speed logic circuits such as, for example, microprocessors.

System Overview

Figure 1:
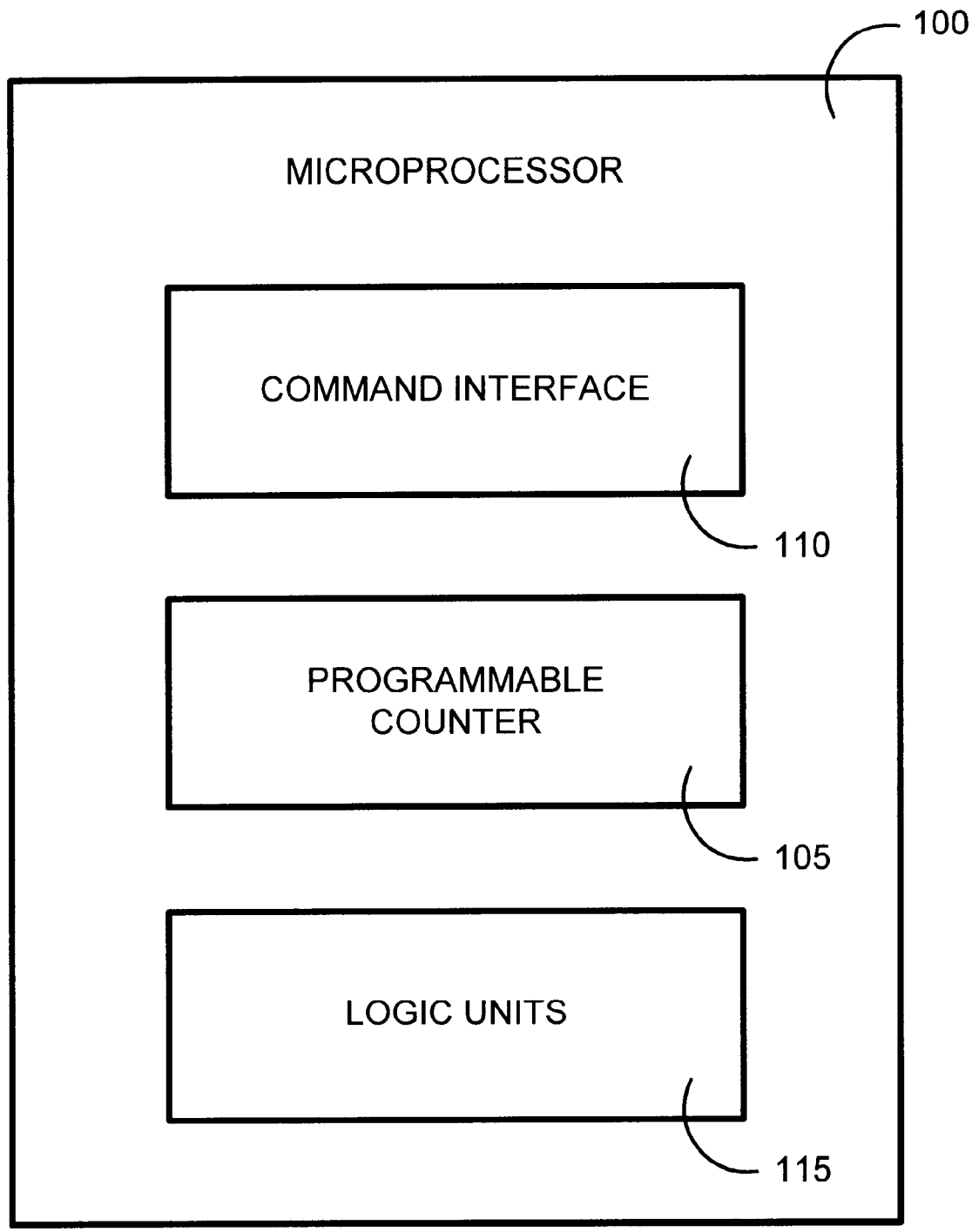
FIG. 1 is a general system diagram illustrating a programmable counter for generating clock pulses in a microprocessor in accordance with the present invention.

FIG. 1 is a general system diagram illustrating a programmable counter for generating clock pulses in a microprocessor in accordance with the present invention. Specifically, a microprocessor 100 contains a programmable counter 105 that is capable of counting to a specified number and generating a clock pulse with each count. The programmable counter 105 is preferably programmed and controlled via a command interface 110. The clock pulses generated by the programmable counter 105 are used to drive logic units 115 within the microprocessor 100.

While FIG. 1 illustrates a generic case where the programmable counter 105 is embedded within a microprocessor 100 containing other logic circuits 115, the programmable counter is not limited to this use. For example, the programmable counter may be used as a separate logic circuit on a single chip that could be used in combination with other logic or microprocessor circuits.

Figure 2:
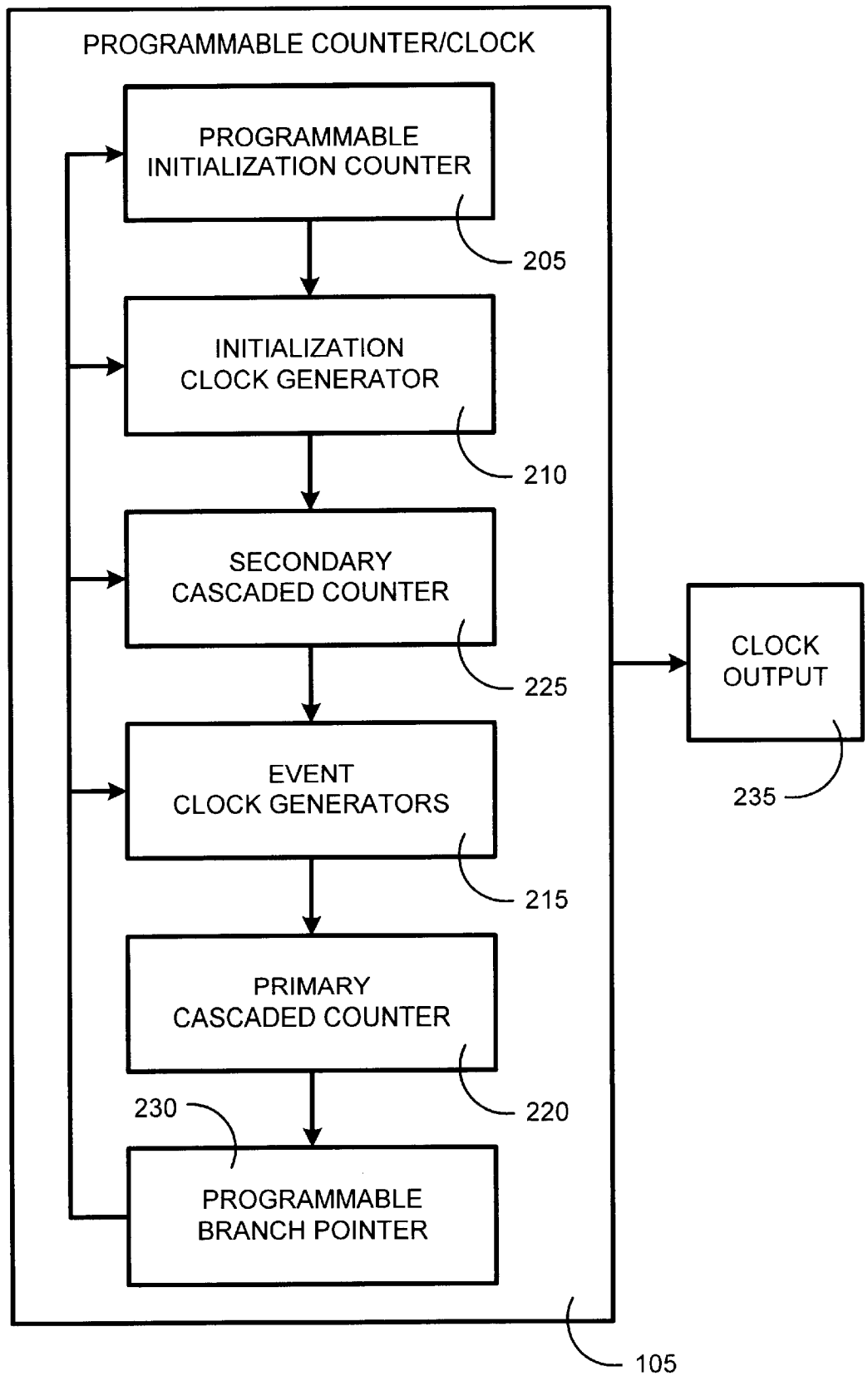
FIG. 2 is a general block diagram illustrating a programmable counter in accordance with the present invention.

FIG. 2 illustrates the basic components of the programmable counter 105 of FIG. 1. FIG. 2 shows the programmable counter 105 containing an initialization counter 205, an initialization clock generator 210, at least one event clock generator 215 disposed in series between a primary counter 220 and a secondary counter 225. The programmable counter 105 preferably also contains a programmable branch pointer 230. Clock signals are preferably output from the programmable counter 105 via a clock output 235.

Operation

In general, an initialization clock coupled to an initialization counter preferably generates a programmable number of clock pulses. Next, one or more event clocks, preferably disposed in series between primary and secondary programmable cascaded counters, each generate, preferably in series, a clock pulse for each count of the secondary cascaded counter, which is programmed to count to a specific number. Further, each of the clock generators is preferably enabled or disabled via an enable latch. Clock pulses are preferably generated by a clock generator when that clock generator is enabled. Once the secondary cascaded counter has completed counting to a specified number, and each of the event clocks has thus generated a series of clock pulses, the count of the primary cascaded counter is preferably decremented. Next, a programmable branch pointer coupled to the primary cascaded counter preferably branches back to either the programmable initialization counter, the initialization clock generator, the secondary cascaded counter, or to any of the one or more event clocks disposed in series between primary and secondary cascaded counters. This process preferably repeats until the count of the primary cascaded counter has counted down to zero from the specified number, at which point the programmable counter of the present invention preferably stops.

Figure 3A:
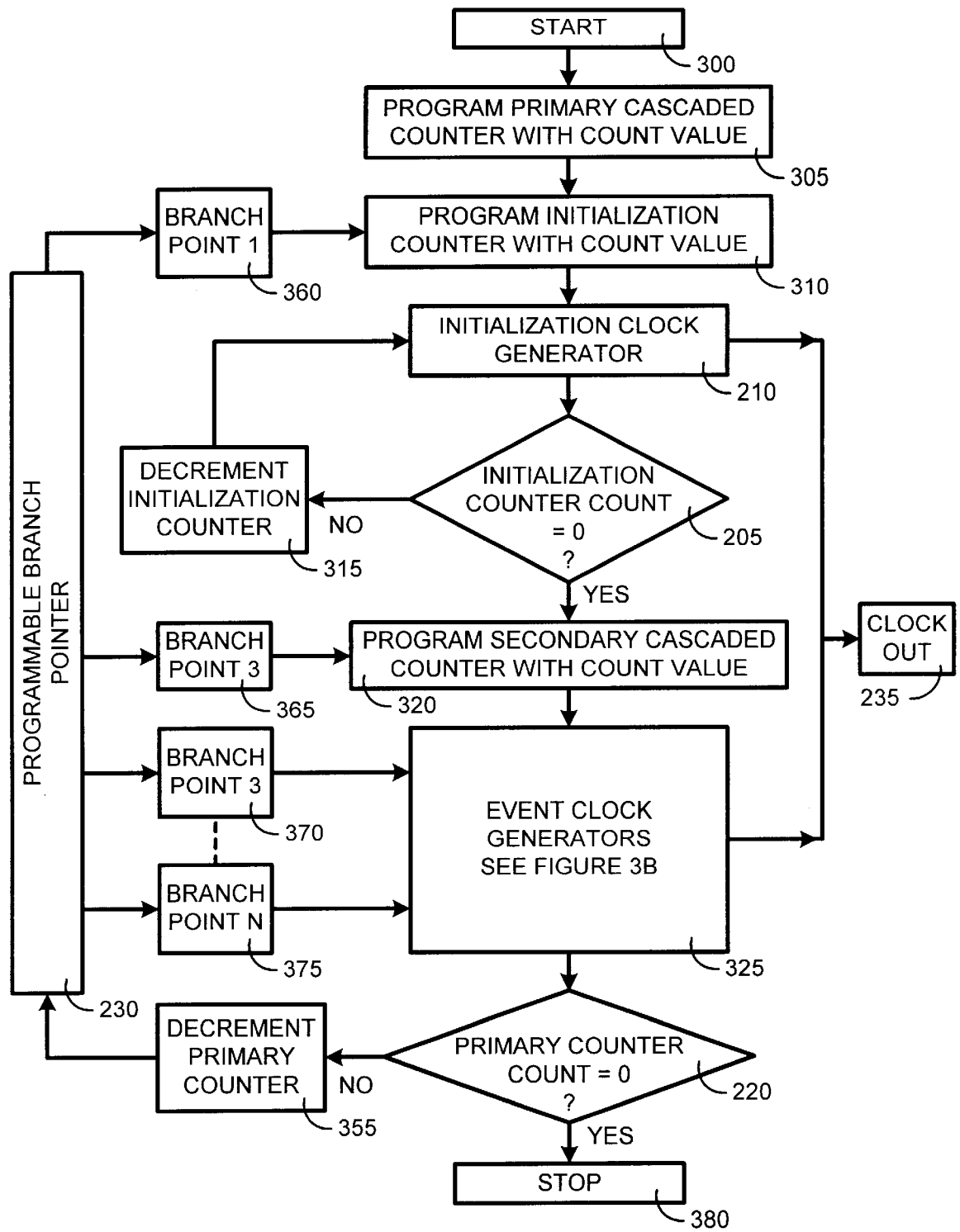
FIG. 3A is a general flow diagram showing the operation of the counter of FIG. 2.
Figure 3B:
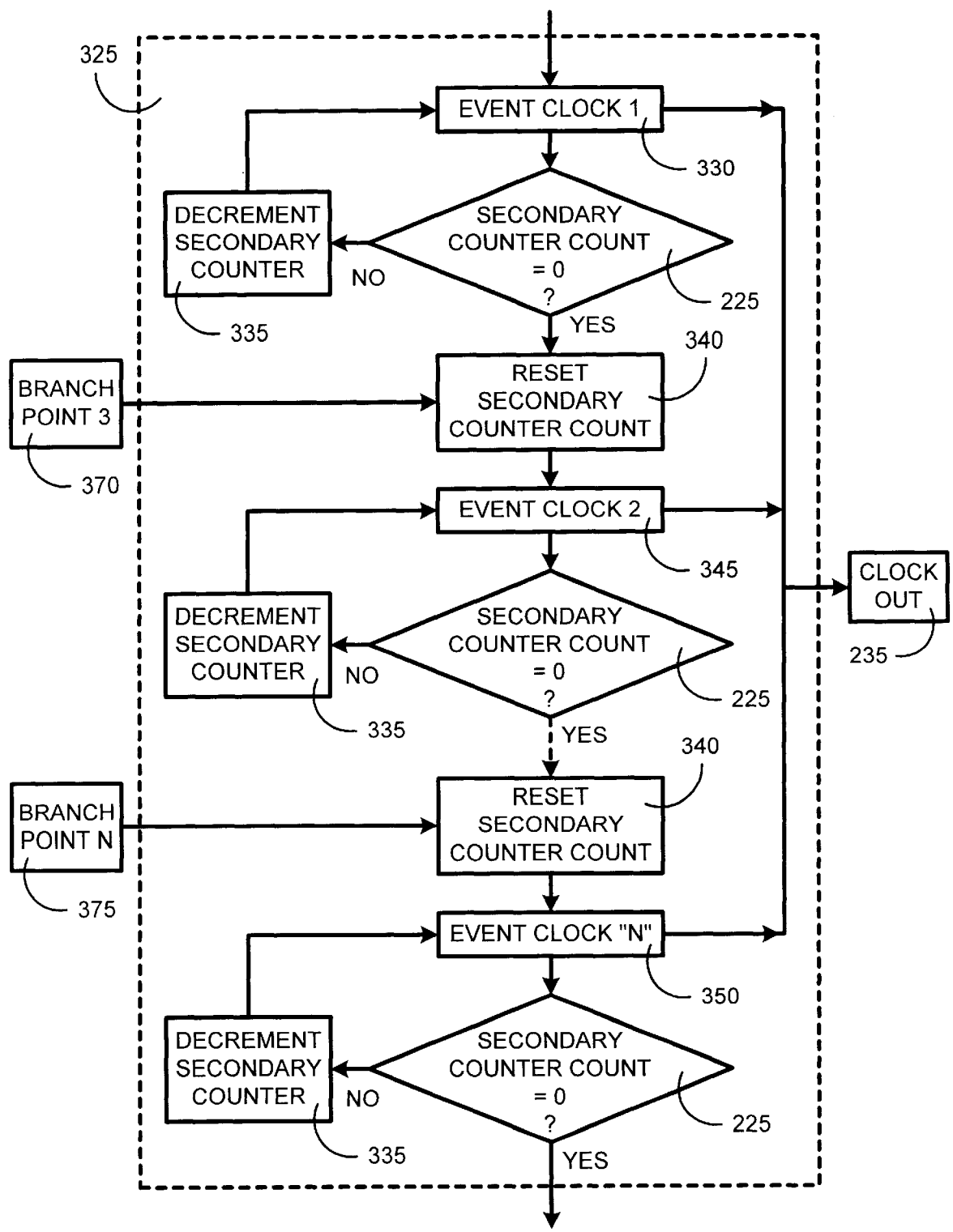
FIG. 3B is a general flow diagram showing the event counters of FIG. 3A.

Specifically, FIGS. 3A and 3B are general flow diagrams illustrating the operation of a programmable counter in accordance with the present invention. Referring to FIG. 2 along with FIG. 3A and FIG. 3B, the programmable counter 105 is preferably started (Box 300) by programming the primary counter 220, with a predetermined count value (Box 305). Similarly, the initialization counter 205 is also programmed with a predetermined count value (Box 310). The initialization clock generator 210 then preferably generates the number of clock pulses programmed into the initialization counter 205. The count of the initialization counter 205 is preferably decremented (Box 315) for each count. Once the count of the initialization counter 205 reaches 0, the secondary cascaded counter 225 is preferably programmed with a predetermined count value (Box 320).

Next, as illustrated in FIG. 3B, one or more event clocks (Box 325) preferably begin sequentially generating clock pulses in response to counts by the secondary cascaded counter 225. Each event clock generator, if enabled, preferably generates a number of clock pulses equal to the number of counts of the secondary counter 225. For example, the first event clock, event clock 1 330, preferably generates the number of clock pulses programmed into the secondary cascaded counter 225. The count of the secondary cascaded counter 225 is preferably decremented (Box 335) for each count. Once the count of the secondary cascaded counter 225 reaches 0, the count value of the secondary cascaded counter is preferably reset to the initial programmed value (Box 340).

Similarly, the second event clock, event clock 2 345, if enabled, then preferably generates the number of clock pulses programmed into the secondary counter 225. Again, the count of the secondary counter 225 is preferably decremented (Box 335) for each count. Once the count of the secondary counter 225 reaches 0, the count value of the secondary counter is preferably reset to the initial programmed value with a predetermined count value (Box 340).

The cycle of resetting the secondary counter 225, and generating clock pulses for each count of the counter, then decrementing the secondary counter as described above preferably continues serially for each event clock N (Box 350) as the secondary cascaded counter counts from the programmed value to 0. Once the last event clock, event clock N 350, has generated clock pulses in response to the count of the secondary cascaded counter 225, the count of the primary cascaded counter 220, as illustrated in FIG. 3A, is preferably decremented (Box 355).

Next, a programmable branch pointer 230 preferably branches back to one of several points in the processes described above, as illustrated in the flowchart of FIG. 3A. Specifically, the programmable branch pointer 230 is programmed to enter one of a number of branch points. The choice of which branch point is addressed by the branch pointer 230 is made in order to achieve a desired count from the programmable counter 105 (as shown in FIG. 2). The programmable counter preferably loops through the branch pointer 230 each time the primary counter 220 is decremented (Box 355) until the count of the primary counter reaches 0, at which time the programmable counter preferably stops (Box 380).

Specifically, the first possible branch point, branch point 1 (Box 360), points back to Box 310, where the initialization counter 205 is programmed with a predetermined value. The value used to program the initialization counter 205 when pointed to by the branch pointer 230 is preferably the same as that used for the initial pass through that counter. However, a unique count value may be programmed into the initialization counter 205 during each pass through the programming step of Box 310.

The second branch point, branch point 2 (Box 365) points back to Box 320, where the secondary counter 225 is programmed with an initial value. As with the initialization counter 205, the value used to program the secondary cascaded counter 225 when pointed to by the branch pointer 230 is preferably the same as that used for the initial pass through the secondary cascaded counter. However, a unique count value may be programmed into the secondary counter 225 during each pass through the programming step of Box 320. Similarly, as illustrated in FIG. 3B, additional branch points, branch point 3 (Box 370) through branch point N (Box 375) may be addressed by the branch pointer 230. In this manner, specific event clocks may be addressed by the branch pointer 230, following a reset of the secondary counter (Box 340).

Control over which branch point (Boxes 360, 365, 370, or 375) is entered during each pass through the branch pointer (Box 230) allows precise control over the specific counts reached by the programmable counter 105 (as shown in FIG. 2).

Working Example

The following description is for illustrative purposes only and describes an embodiment of a programmable counter in accordance with the present invention. It should be noted that although the following description involves a programmable counter having counter bit depths of only 4-bits, an initialization clock and only one event clock, any size counter bit-depth and number of event clocks can be used as discussed previously.

For example, referring back to FIG. 2, the programmable counter of the present invention may use a four-bit initialization counter 205 followed by a clock generator 210 and both primary 220 and secondary 225 cascaded counters that are also four-bits wide, with an event clock generator 215 disposed between the primary and secondary cascaded counters, and a programmable branch pointer 230 coupled to the primary cascaded counter.

With a four-bit depth, the initialization counter 205 can be programmed to count to any number between 0 and 15. Consequently, the initialization clock generator 210 is capable of generating from 0 to 16 clock pulses. Further, the four-bit cascaded counters 220 and 225 with the event clock generator 215 are capable of generating any number of counts between 0 and 255, and thus from 0 to 256 clock pulses. Consequently, the programmable counter of this example is capable of reaching any specific count, and thus clock pulses, between 2 and 272, with a maximum count of 512.

Specifically, in order to count to a specific number, such as, for example 163, using the above described programmable counter, the initialization counter 205 would be programmed with the number 2, the primary counter 220 would be programmed with the number 9, and the secondary counter 225 would be programmed with the number 15. Three clock pulses would be generated by three passes through the initialization clock generator 210, at which point the event clock generator 215 would generate 16 clock pulses. The primary counter 220 would then be decremented, and the branch pointer 230 would point back to programming the secondary cascaded counter 225, where the secondary cascaded counter would again be programmed with the number 15. This process would repeat for 8 more cycles, with the primary cascaded counter 220 decrementing until the primary count reached 0. Then, one last set of loops through the event clock generator 215 following the secondary cascaded counter 225 would be made. Consequently, a total of ten passes through the secondary cascaded counter/event clock loop would be made for a total of 160 clock pulses (10 passes at 16 clock pulses each). When added to the 3 clock pulses generated by the initialization clock 210, it can be seen that 163 clock pulses are generated using the initial parameters as described above. Similarly, as discussed above, any number of clock pulses between 0 and 272 may be generated by the programmable clock of this example.

In the more generic case, because each of the event clock generators may be either enabled or disabled, the minimum number of clock pulses that may be generated by the programmable clock of the present invention is 0. Further, the maximum continuous range of counts that may be achieved by the programmable clock of the present invention may be determined by Equation 1: Max Specific Count= $2^{(x+y)} \times (z-1) + 2^i$, where x is the bit-depth of the primary counter, y is the bit-depth of the secondary counter, z is the total number of clock generators in the programmable clock, and i is the bit-depth of the initialization counter. Consequently, in accordance with Equation 1, Table 1 illustrates the possible ranges of one small set of programmable clocks in accordance with the present invention.

TABLE 1

| Primary Counter Bit-Depth | Secondary Counter Bit-Depth | Initialization Counter Bit-Depth | Total Number of Clock Generators | Specific Range |
|---|---|---|---|---|
| 4 | 3 | 3 | 2 | 0 through 136 |
| 4 | 4 | 4 | 2 | 0 through 272 |
| 4 | 3 | 3 | 4 | 0 through 392 |
| 4 | 4 | 4 | 3 | 0 through 528 |
| 20 | 16 | 16 | 4 | 0 through 206,158,495,744 |

As can be seen from Table 1, an extremely broad range of counts, and therefore clock pulses, may be achieved by relatively small increases in the bit-depth of the primary 220, secondary 225, and initialization counters 205, as well as a relatively small increase in the number of event clocks 215. For example, as shown above in Table 1, with a primary counter 220 bit-depth of 20 bits, secondary 225 and initialization counter 205 bit-depths of 16 bits, one initialization clock 210 and three event clocks 215, a specific number of clock pulses of from 0 to over 200 billion is possible.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for generating a programmable number of clock pulses for driving a logic circuit comprising:
    generating clock pulses within an iterative process comprising a plurality of programmable counters and clock generators; and
    entering at least one branch point within the inerative loop using a programmable branch pointer.

2. The method of claim 1 wherein the at least one branch points comprise any one of the plurality of programmable counters and clock generators.

3. A method for generating a programmable number of clock pulses comprising:
    a primary programmable counter and at least two secondary programmable counters which are cascaded to provide a programmable count;
    generating clock pulses with at least one primary clock generator and at least one secondary clock generator disposed between the secondary programmable counters; and
    entering at least one branch point using a programmable branch pointer connected to a last cascaded counter.

4. The method of claim 3 wherein the at least one primary clock generator following the primary programmable counter generates a clock pulse for each count of the primary programmable counter.

5. The method of claim 3 wherein the secondary counters are cascaded to form a loop such that a first cascaded counter will repeatedly count to a programmable number for a number of cycles equivilent to a programmable count for a last cascaded counter.

6. The method of claim 5 wherein the at least one secondary clock generator disposed between the secondary counters each generate a clock pulse for each count of the first cascaded counter.

7. The method of claim 3 wherein the at least one branch points comprise any one of the programmable counters and any one of the clock generators.

8. A method for generating a specific clock count, comprising:
    counting to a programmable number with a first counter;
    generating a clock pulse with a first clock generator for each count of the first counter;
    counting to a programmable number with a second counter;
    repeating the programmable count of the second counter for a programmable number of iterations using a third counter;
    generating a clock pulse with a second clock generator for each count of the second counter; and
    using a programmable branch to reinitialize the first counter to generate a clock pulse with the first clock generator for each count of the first counter.

9. The method for generating a specific clock count of claim 8 wherein the programmable branch is capable of reinitializing the second counter to generate a clock pulse with the second clock generator for each count of the second counter.

10. The method for generating a specific clock count of claim 8 further comprising generating at least one additional clock pulse for each count of the second counter with at least one additional clock generator in series with the second clock generator.

11. The method for generating a specific clock count of claim 10 wherein the programmable branch has the capability to reinitialize the second counter such that any of the additional clock generators in series with the second clock generator generate an additional clock pulse for each count of the second counter.

12. The method for generating a specific clock count of claim 8 wherein the first, second and third counters may be programmed to count to a desired number.

13. The method for generating a specific clock count of claim 8 wherein the bit-depths of the first, second and third counters are equivalent.

14. The method for generating a specific clock count of claim 8 wherein the bit-depths of the first, second and third counters are different.

15. The method for generating a specific clock count of claim 8 wherein the programmable branch is capable of reinitializing any of the first counter, the first clock generator, the second counter, and the second clock generator to generate a specific number of clock pulses with any of the first and second clock generators.

16. A system for generating a specific number of clock pulses comprising:
    a first counter coupled to a first clock generator for initiating a clock pulse with each count of the first counter;
    a second counter coupled to the first clock generator for initiating a clock pulse with a second clock generator with each count of the second counter;
    a third counter coupled to the second counter for allowing multiple counting cycles by the second counter; and
    a programmable branch for restarting the system for generating a specific number of clock pulses from any one of a plurality of branch points within the system.

17. The system of claim 16 wherein at least one additional clock generator is coupled in series to the second clock generator for generating a clock pulse with each additional counter with each count of the second counter.

18. The system of claim 17 wherein the programmable branch is capable of restarting the system from any one of the first counter, the first clock generator, the second counter, the second clock generator, and any one of the at least one additional clock generators coupled in series to the second clock generator.

19. The system of claim 17 wherein any of the first clock generator, the second clock generator, and any one of the at least one additional clock generators coupled in series to the second clock generator have the capability to be individually enabled via individual enable latches coupled to each clock generator.

20. The system of claim 19 wherein the first clock generator, the second clock generator, and each of the at least one additional clock generators coupled in series to the second clock generator generate clock pulses when enabled via the individual enable latches.

21. A high-speed programmable counter that counts to a desired number, comprising:
   a first subcounter for counting to a first number;
   a first clock generator coupled to the first subcounter for generating a clock pulse for each count of the first subcounter;
   a second subcounter coupled to the first clock generator for counting to a second number;
   a third subcounter coupled to the second subcounter for counting to a third number, and wherein the second subcounter repeats the count to the second number for a number of cycles equal to the third number;
   at least one secondary clock generator disposed between the second and third subcounter wherein each of the secondary clock generators generates a clock pulse for each count of the second subcounter; and
   a programmable branch for continuing the count of the programmable counter from any one of a plurality of branch points within the programmable counter.

22. The programmable counter of claim 21 wherein any of the first clock generator, and the at least one secondary clock generators have the capability to be individually enabled via individual enable latches coupled to each clock generator.

23. The programmable counter of claim 22 wherein the first clock generator, and the at least one secondary clock generators generate clock pulses when enabled via the individual enable latches.

24. The programmable counter of claim 23 wherein the bit-depths of each of the first, second, and third subcounters are a different size.

25. The programmable branch of claim 21 wherein the branch points comprise any of the first subcounter, the first clock generator, the second subcounter, and any one of the at least one secondary clock generators.

* * * * *